Aug. 19, 1947.  E. L. KENT  2,425,811
APPARATUS FOR MEASURING VOLTAGES
Filed June 5, 1942  2 Sheets-Sheet 1
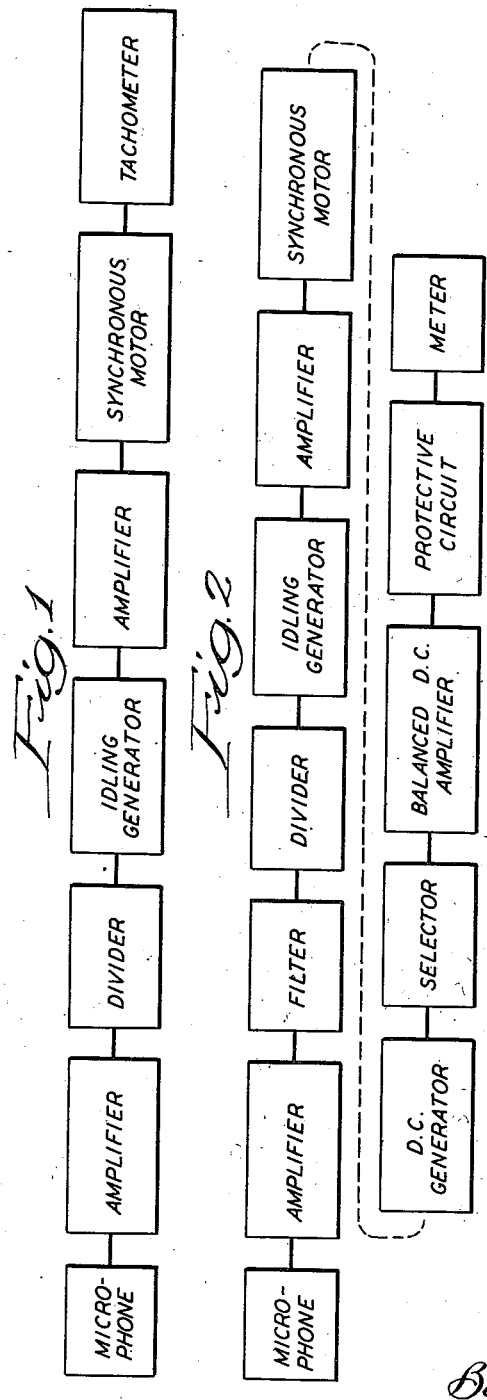

Aug. 19, 1947.  E. L. KENT  2,425,811
APPARATUS FOR MEASURING VOLTAGES
Filed June 5, 1942  2 Sheets-Sheet 2
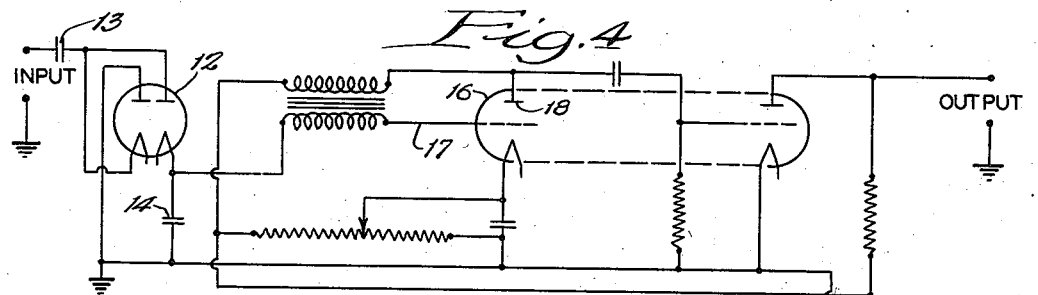
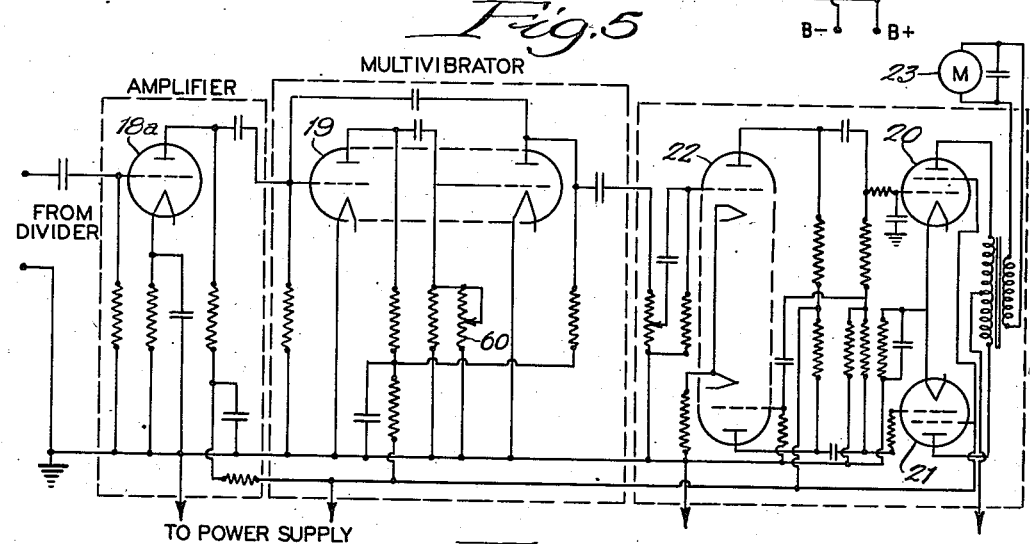
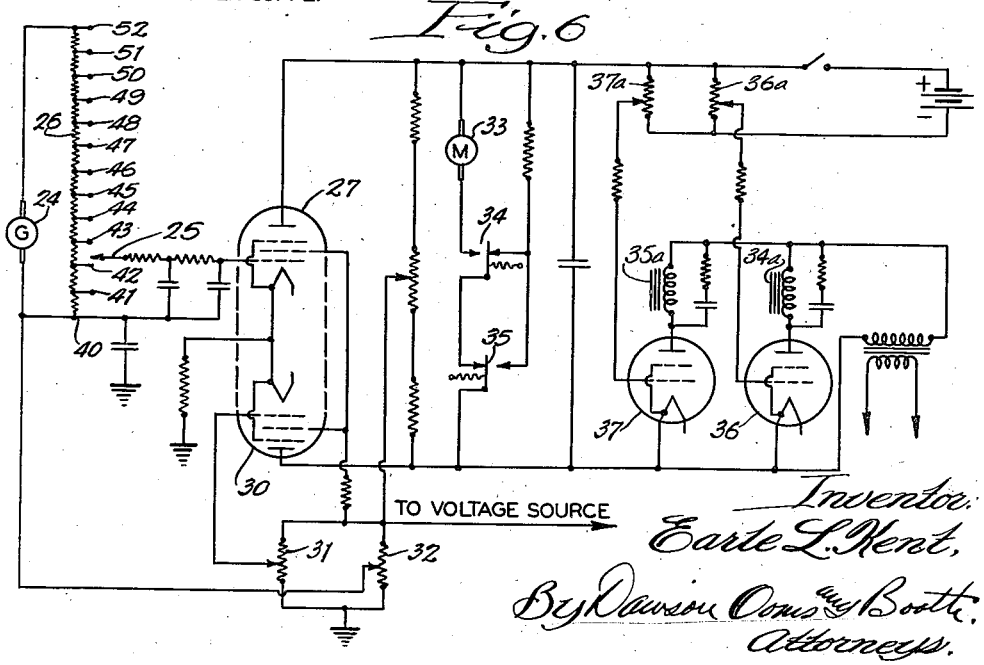

Patented Aug. 19, 1947

2,425,811

UNITED STATES PATENT OFFICE 2,425,811

APPARATUS FOR MEASURING VOLTAGES

Earle L. Kent, Elkhart, Ind., assignor to C. G. Conn, Ltd., Elkhart, Ind., a corporation of Indiana Application June 5, 1942, Serial No. 445,990

4 Claims. (Cl. 171—95)

This invention relates to apparatus for measuring voltages, and more particularly to the measurement of voltages which vary with changes in frequency throughout an extremely wide range of frequencies.

There are many situations where it is desired to know the frequencies of certain vibrations and where such frequencies cannot be measured by direct means due to the rapidity of the vibrations or to other difficulties. In such situations waves either within or beyond the audible range are generated which correspond in frequency to the variations or movements and this invention contemplates measurement of the frequencies of the waves so generated by producing a direct voltage which varies with the frequencies and measuring the direct voltage to thereby obtain an indication of the frequencies of movement which could not be directly measured.

The invention is useful also for measuring voltages which vary with the frequencies of sounds however produced and is particularly valuable for the accurate measurement of wave frequencies over a very large range.

It is a further feature of the improved apparatus that it can be easily adjusted to accommodate a great range of voltages and for greater or lesser sensitivity according to the needs of the measurement being made. For example, when measurements are being made in the lower musical octaves where the difference in frequency between the tones is small, a greater change of voltage may be produced per semitone and when the measurements are in the higher octaves where the difference in frequency between the tones is larger, a lesser change of voltage per semitone.

While the improved apparatus can be extremely sensitive to alterations in the voltages of the source being measured, it is a further feature that the meter used in my form of the invention will not be injured by any substantial change in the source voltage, there being provided sensitive means for disconnecting the meter when the source voltage is not within the range which it is set to measure.

Other objects and advantages of the invention will be apparent after reference to the following description and the accompanying drawing in which—

Figure 1 is a diagram in block form illustrating the separate elements and their sequence in one embodiment of the invention;

Figure 2 is a diagram in block form similar to Figure 1, but illustrating a second embodiment of the invention;

Figure 3 is a diagram of an electrical circuit which is suitable for performing the function of the amplifier element and the filter or wave-correcting element indicated in Figure 2;

Figure 4 is a diagram of a circuit suitable for performing the function of the octave divider given in Figure 2;

Figure 5 is a diagram of an electrical circuit which is suitable for performing the function of the power amplifier, synchronous motor and idling generator given in Figure 2; and Figure 6 is a diagram of an electrical circuit which is suitable for performing the function of the balanced D. C. amplifier, the interval selector, the protective circuit, and the meter elements given in Figure 2.

Referring to Figure 1, the improved apparatus includes a microphone transducer for translating the frequencies to be measured into electrical impulses. Any ordinary and suitable instrument of common make may be utilized for this purpose and this element is therefore not shown in detail. However, the electrical response generated by the transducer is ordinarily too low in energy for activating the synchronous motor and amplifying means are inserted to boost the energy as may be needed.

As set forth in Figure 1, the response of the microphone is amplified and fed to the frequency divider which performs the function of dividing the frequency or multiplying it as the case may be to bring the variations into a frequency range where synchronism can be had with the motor. By the frequency divider an input frequency of 200 pulsations per second, for example, are made to appear as 100 pulsations per second, and 100 pulsations per second are made to appear as 50. Of course other ratios may be employed as is desired.

The idling generator has the function of providing a certain minimum frequency which may serve as a base in the measurement of the pulsations having higher frequency and also serves to maintain the synchronous motor in operation so that no time is lost by having to wait until the motor gets started. This generator is set to deliver a certain minimum frequency when there is no impulse picked up by the microphone. When the higher frequency is passed to it by the divider it is this higher frequency which is passed on at the output. Following the idling generator a power amplifier is interposed and its output is fed to the synchronous motor. The speed of the shaft of the synchronous motor is a direct measure of the input frequency, and this speed may be indicated by a tachometer of any suitable type. The reading of the tachometer, then is a direct indication of the frequency which it was desired to be measured.

The modification illustrated in Figure 2 carries elements similar to those briefly described in connection with Figure 1, and contains also several additional features. This system may include a low-pass filter before the divider, and the purpose of this is to eliminate extraneous frequencies higher than the frequency desired to be measured. Any suitable type of filter may be employed for this purpose. Desirably, a suitable electronic device may be operated beyond its point of linear response and so serve as a filter and also for converting the wave to a substantially square wave form which is more satisfactory as input to the divider circuit.

Also in this modification there is included an improved tachometer wherein a direct current generator is run by the synchronous motor. This generator is of the type which generates a voltage which is directly proportional to its speed. The generated voltage is then measured by sensitive electronic means. As given in Figure 2, the generator output is fed to a selector which is a potentiometer controlling the range and sensitivity of the meter reading. The partial voltage from the potentiometer is then passed on to affect the balanced amplifier circuit which in turn produces a response in the meter. There is also included a protective circuit for disconnecting the meter circut when the reading would be dangerously off-scale in one or another direction.

Specific types of equipment which may be used for the various portions of the instrument are illustrated in Figures 3 to 6. Figure 3 shows the terminals 10 through which the response from the microphone is fed into a two stage amplifier. This amplifier may be of any desired number of stages and may be of standard and well known construction. The output of the amplifier is passed through the amplifier-limiter tube 11. This tube is driven beyond the point of linear operation and a sinusoidal input at the input will produce substantially square waves across the plate load. Its output is fed to the divider circuit.

Figure 4 is a type of divider circuit which may be used. This circuit includes the tube 12 which has in its input the condenser 13 and has in the cathode circuit of one of its diode sections the condenser 14. These two condensers are in series with each other and also with one diode section. When the potential across the plate resistor 15 (Figure 3) is changing in a positive direction it causes an increase in potential across the condenser 14. The series condensers 13 and 14 act as a voltage divider so that the voltage across the condenser 14 will build up to a value depending upon how high the voltage across the resistor 15 reaches and according to the ratio of the two condensers. During the flat top portion of the wave the voltage across the condenser 14 remains constant since it cannot leak off through the diode through which it is charged and there is no other path to ground. When the voltage across the resistor 15 changes in a negative direction the voltage across the condenser 14 still is unaffected because of the valve action of the diode section in series with it. At this time the left hand section of the tube conducts to ground to prevent the building up of undesirable negative charges on the condenser. However, when the next cycle begins the voltage across resistor 15 again changes in a positive direction and once more current flows through the two series condensers causing another increment of voltage to that already existing across the condenser 14. The following cycle adds another increment of voltage in the same way, and so on, until tripping of the device takes place.

Included in the divider circuit also is the tube 16 which is a double section tube set up as an oscillator and designed to build up, upon oscillation, a charge on its grid 17 which immediately blocks oscillation. As voltage across condenser 14 is built up by successive waves, grid 17 reaches the critical voltage at which oscillation is initiated and the condenser 14 discharged through the grid-cathode circuit of the tube 16. During this tripping action a voltage pulse is created between the plate 18 of the tube 16 and ground. Then the voltage across the condenser 14 starts building up all over again until the critical voltage is reached at grid 17 to develop another pulse in the plate circuit. If the constants are set to require, for example, 5 cycles to build up this critical voltage then this divider circuit will deliver one impulse for every five impulses it receives.

Desirably two or three or more of the circuits as illustrated in Figure 4 may be adapted for connection in series so that the effects of these circuits may be multiplied. Thus, for example, if two such circuits are used and each requires 5 impulses for tripping action, then there would be one impulse delivered by the output of the second circuit for every 25 delivered to the first circuit.

The purpose of the divider is to translate the number of impulses to within the range of frequencies which can be accommodated by the synchronous motor. It is usual that the frequencies to be measured are considerably higher than the range which can be accommodated by motors of this type and the divider is thus a kind of translating device for bridging this gap. It is, of course, possible that it would be desired to measure frequencies below the range of the motor, and in such case a multiplier of frequencies could be substituted for the divider.

Though the specific type of divider shown in Figure 4 is one which proves highly satisfactory in this system, other known types of dividing or multiplying devices may be employed. Or, in case the frequencies to be measured are within the range of operation of the motor, the divider circuit may be omitted altogether from the system.

As indicated in the drawings, the output of the divider circuit may be passed through a power amplifier and to the synchronous motor. The power amplifier may be of any standard design. Figure 5, however, illustrates a specific set up in which the further feature of an idling generator is also employed. Referring particularly to Figure 5, tube 18ª is a conventional amplifier whose grid circuit may be connected to the output of a divider circuit as illustrated in Figure 4 and whose plate circuit may be coupled to the grid of the tube 19 in the circuit designated "multivibrator" on the drawing. This multivibrator is a two-stage resistance-coupled amplifier in which the voltage developed at the output of the second triode section is applied to the input of the first triode section. A minute voltage at the grid of one tube will start oscillation causing the grid of one section to become quite positive while the grid of the other becomes quite negative producing a cut-off of amplification. However, when the leakage through the resistors in the grid circuits is sufficient to bring the system to the verge of amplification condition, then a slight voltage will cause amplification to take place in a reverse direction. The time between oscillations is governed primarily by the grid-leak resistance and the grid condenser capacity.

Thus the multivibrator, which is a type of idling generator, will develop some desired frequency, and this impressed in the motor energizing circuit will cause the motor to run at some idling speed when frequency measurements are about to be taken but are not yet impressed. This eliminates the necessity for waiting each time a test is made for the motor to build up from standstill to operating speed.

The multivibrator has the ability to accommodate its oscillations to the frequencies impressed. It is generally adjusted to oscillate normally at a frequency below that delivered by the divider in measurement, so that when the measurement is being taken the multivibrator may increase its oscillations to come into step with the frequencies impressed upon it.

The multivibrator circuit specifically illustrated is one which is satisfactory to serve the purpose of an idling generator, but other known circuit arrangements may be used also. In fact, the improved system may be operated very satisfactorily without an idling generator, and this feature need not be used unless its particular advantages are desired.

As set out in Figure 5, the output of the multivibrator is fed to an amplifier of the push-pull type employing an inverter to take care of the phase of the respective grid voltages. The tubes 20 and 21 are connected in the push-pull relationship and the tube 22 is utilized as an inverter. Any suitable amplifying arrangement might be substituted for the specific amplifying set-up here shown.

The motor 23 is connected to drive the generator 24, and the voltage developed at this generator is impressed at a potentiometer which is adjusted by the interval and sensitivity switch 25 (see Figure 6). The generator voltage is impressed across the resistance 26 and along this resistance are a number of taps 40 to 52, and the switch 25 may be moved to any one of these taps. The potential across the selected taps is impressed at the grid of the tube 27 desirably through a network effective to suppress the commutator ripple of the generator 24. Thus with a given generator voltage the voltage which is impressed at the grid of tube 27 is governed by the setting of switch 25.

Tube 27 along with tube 30 and associated circuits makes up a thermionic device comprising a balanced D. C. amplifier which controls the voltage which is impressed across the meter 33 which, of course, determines the meter reading. The tubes 27 and 30 should have the usual plate, filament and grid elements and are termed triodes, this term being used to designate a device having at least these three elements but being intended to include also devices having more elements such as tetrodes, pentodes, etc.

The two potentiometers 31 and 32 at the lower portion of Figure 6 are bias adjusting controls and will be set so that the direct current bias on the tubes 27 and 30 is the same when the generator 24 is delivering its idling voltage.

With such a balanced condition no current will flow through the circuit of the meter 33, though the relays 34 and 35 are in condition to permit such flow. However, when the generator voltage is increased, the voltage at the grid of tube 27 will be increased and the amplifier will no longer be balanced. With the amplifier unbalanced current will flow through the meter circuit if the relays will permit. The meter will indicate how much change there has been in the voltage generated which, in turn, is an indication of the frequency to be measured.

There would be danger of injuring the meter if, at some particular setting of switch 25, the frequency being measured were high enough to cause an "off-scale" reading, and to eliminate this hazard there may be provided protective circuits which will automatically disconnect the meter circuit when this "off-scale" condition exists.

Referring to Figure 6, the relay 34 must be energized and the relay 35 de-energized in order to complete the circuit through the meter. The relay 34 is controlled by the gaseous tube 36 which is prebiased so that the voltage across the plates of the tubes 27 and 30 must be of proper value and sense before it will "fire" and energize the coil 34a which is associated with relay 34. While coil 34a is energized the relay 34 is effective to pass current through the meter circuit. If the voltage at the plates of the tubes 27 and 30 should reverse in sign, the relay 34 would be de-energized and the meter circuit opened. On the other hand, if the voltage at the plates of tubes 27 and 30 should exceed the amount which is safe for the meter 33, then the gaseous tube 37 is caused to "fire" producing energization of coil 35a of the relay 35 which opens the circuit through the meter. Thus, if the voltage across the meter is dangerously "off-scale" in either direction, the protective mechanism comes into operation to prevent injury to the instrument. The grid bias control 36a and the grid bias control 37a are adjustable to regulate the respective operating potentials which will trip the respective relays.

Advantageously, a meter may be used which has its zero indication at the center of the scale. When using such a meter, if the frequency being measured is exactly in tune, the meter reads zero or center scale. If the frequency measured be slightly lower then the meter swings to the left, and if higher, to the right. It is possible to calibrate the meter reading, and since the pitch-frequency relation is logarithmic, such a short portion of the whole pitch-frequency curve is involved in full scale deflection of the meter that the calibration will be substantially linear.

Auxiliary contacts on each of the relays may be arranged to operate pilot lights to indicate if the frequency of the signal is too high for the particular setting of the apparatus, or if it is too low.

By interposing a thermionic device between the potentiometer and the meter, the meter is made quite sensitive to a small change in the generated voltage and therefore to small changes in the frequency being measured, and this is especially true when the thermionic device is a balanced D. C. amplifier arrangement as illustrated in Figure 6.

By providing a potentiometer regulating what part of the generated voltage is passed to the thermionic device, the range of frequencies which can be measured is increased many fold and also increased sensitivity is provided when required. The higher settings of the potentiometer switch 25 produce a condition such that relatively small increments of increased generator voltage produce relatively large changes in the effect on the thermionic device and consequently on the meter reading; whereas, the lower settings of the switch 25 produce a condition such that relatively large increments of increased generator voltage produce relatively small changes in the effect on the thermionic device and consequently on the meter reading. This is advantageous since greater sensitivity is usually needed when lower frequencies are measured. The musical scale is logarithmic as to frequency and the difference between tones is doubled each octave, so it is useful to increase the sensitivity as the frequencies become lower if accuracy is to be obtained.

*Operation*

The operation of my improvements will now be described in measuring the frequencies of from about 32 to about 4000 cycles per second using the modification illustrated in Figure 2, these frequencies and this modification being selected only for purposes of explanation.

If the frequency range of the synchronous motor is 30 to 60 cycles per sec., for example, the multivibrator may be adjusted by varying the resistor 60 (see Figure 5) to produce an output frequency of 30 cycles per second, this output being amplified and impressed on the motor 23, so as to run this motor at a minimum or idling speed. Motor 23 drives generator 24 at a corresponding minimum rate and a minimum generated voltage is delivered to the potentiometer. Since it is intended to first measure the lower frequencies the switch 25 is set at a high setting, as on point 52, permitting full developed voltage to have effect on the grid of the tube 27. Potentiometers 31 and 32 are then adjusted to bring the tubes 27 and 30 into balanced relation so that the voltages produced by their plate currents are equal and opposite and the meter reading indicates no voltage being impressed across it. Also, since very low frequencies are to be measured at the start, the divider circuits need not be used and the output of tube 11 may be fed by suitable jacks and connectors to the multivibrator unit. With this set-up measurement may be begun.

The lower frequency to be measured (32 cycles per sec.) is picked up by the microphone and the sound waves thus converted to electrical waves. The electrical waves are amplified and then converted into square wave form by the tube 11. This wave form, being impressed on the multivibrator, causes the multivibrator to speed its operation and deliver impulses corresponding with the frequency to be measured. These impulses after amplification cause the synchronous motor to run at a speed slightly faster than idling speed, and this causes a small increase in voltage produced by the generator 24. Such increase disturbs the balance of the tubes 27 and 30 to which meter 33 is sensitive. The meter reading is a measure of the degree of unbalance so produced which is indicative of the frequency to be measured. Suitably, switch 25 and potentiometers 31 and 32 are adjusted to bring tubes 27 and 30 into balanced relationship when the motor and generator are running at idling speeds so that under idling conditions the meter reading will be zero. Or, if desired, this adjustment may be such as to bring these tubes into balanced condition at some particular speed other than idling speed and corresponding with a selected frequency; in such case, the meter will indicate the variation from such speed and frequency.

If the frequency being measured increases slightly, the meter reading will increase substantially, and when the meter is about to go "off-scale," the switch 25 may be placed on the next lower position. This brings the voltage of the grid of tube 27 back to where it was before though the frequency being measured is increased, and also serves to decrease the sensitivity of the instrument somewhat.

This procedure may be continued as frequency is increased until an octave, or some such range, has been covered. Of course, the reading of the meter must be interpreted differently for each setting of the switch 25, as with lower settings of this switch the same meter readings will indicate a much higher frequency. Then at the end of this octave or range of frequencies, one of the divider circuits may be plugged in so that the frequency passed to the multivibrator is only one-half, for example, of the frequency to be measured. The selector switch 25 may then be placed on a high point, and the same procedure used to measure the frequencies of a higher octave. After this procedure, a second divider circuit may be plugged in along with the first, and the measurement procedure repeated. Still further divider circuits could be utilized if necessary, to reach the top of the frequency range desired to be measured. Or, if desired, the divider may be adjusted to make it divide by different numbers, so that the frequency passed on is only ⅕ or ⅛, for example, of the frequency to be measured. In certain instances it is advantageous to use two or more units each of which is adjustable in order to better accommodate any possible frequencies which are to be measured.

Should it occur during measurement that the frequency is greater than can be accommodated by the setting of the instrument, the voltage between the plates of tubes 27 and 30 will cause tube 37 to "fire" thus actuating relay 35 and so opening the meter circuit. Should it occur that the plate circuit voltage become reversed through any cause, which would tend to make the meter read below zero, the tube 36 would operate to cause relay 34 to open the meter circuit.

The use of the idling generator such as the multivibrator specifically described is advantageous in that it enables tests to be made successively on a number of different frequency sources without each time waiting until the synchronous motor is brought up to speed. As was before explained, it is possible to utilize the apparatus without an idling generator.

An important advantage of this system is that the shape and the amplitude of the input wave may vary over very wide limits without affecting the accuracy of the measurement. Another important advantage is that the accuracy of the system is independent of line voltage variations and variations in the thermionic tubes and other circuit parts leading to the D. C. generator.

Though the operation of the improved apparatus has been given in connection with the modification given in Figure 2 of the drawings, it will be apparent that the same principles of operation apply to Figure 1 and other modifications.

Though the means given in Figure 2 for measuring the speed of the synchronous motor is deemed of particular value in measurements of this type, other means such as mechanical tachometers, may be used for this function.

The improved apparatus is particularly useful for measuring the speed of certain machinery such as supercharger devices where buckets pass a jet in rapid succession and which cannot be measured by ordinary direct drive tachometers. In such instances, the microphone of the present apparatus can be placed adjacent the machinery to pick up the waves generated by the buckets and the speed of the pulsations, however rapid they may be, can be read very accurately. From this it is easy to obtain the precise speed of any part of the machinery moving in this unit. The apparatus is also of utility in vocal or instrumental musical testing or training as well as for numerous other uses. It is sensitive not only to ordinary sound waves but to mechanical waves of a wide range of frequencies and to electrostatic waves as well. Where electrostatic waves are involved, an electrostatic pick-up is used as a transducer in place of the microphone illustrated, and the frequency of the electrostatic waves is measured in the same way as has been specifically described in connection with sound waves. For example, where the speed of rapidly rotating blades is to be measured, the electrostatic pick-up is placed near by and the moving blades produce a varying capacity with respect to the pick-up the frequency of which is measured by the device. Or, a photoelectric cell may be used to pick up variations in light, and waves of this nature measured as to frequency. If the waves to be measured are electrical, the pick-up may be omitted and connection made direct to the amplifier.

It is to be understood that the improved apparatus may be changed and may take a number of modified forms other than those herein described. The foregoing description is given for purposes of explanation only and is not to be taken in a limiting sense.

What is claimed is:

1. Apparatus for measuring electrical voltages comprising a potentiometer including a resistance supplied at its ends with said voltages and having a plurality of taps so spaced as to produce substantially a logarithmic variation in voltage from one tap to another, a voltage responsive meter sensitive to the voltage across one end of the resistance and a selected one of the taps, a pair of switches in circuit with the meter, means responsive to the voltage impressed on the meter to operate one of the switches to open the meter circuit when the voltage exceeds a safe value and a second means responsive to the voltage impressed on the meter to operate one of the switches to open the meter circuit when the voltage is negative to the normal scale of the meter.

2. Apparatus for measuring electrical voltages comprising a potentiometer including a resistance supplied at its ends with said voltages and having a plurality of taps so spaced as to produce substantially a logarithmic variation in voltage from one tap to another, a voltage responsive meter sensitive to the voltage across one end of the resistance and a selected one of the taps, a pair of electronic valves responsive to the voltage impressed on the meter, and switch means operated by the valves in circuit with the meter, one of said valves operating one of the switch means to disconnect the meter when the voltage is below a predetermined value which is negative with respect to the normal scale of the meter and the other operating the other switch means to disconnect the meter when the voltage is above a higher predetermined value.

3. Apparatus for measuring electrical voltages comprising a normally balanced thermionic amplifier supplied with said voltages to be unbalanced in response to changes in the voltages, a meter connected to the amplifier to indicate the voltage unbalance thereof, a pair of electronic valves responsive to the voltage unbalance of the amplifier, and switch means operated by the valves in circuit with the meter, one of the valves operating to disconnect the meter from the amplifier when the voltage unbalance exceeds a predetermined value and the other operating to disconnect the meter from the amplifier when the voltage unbalance becomes negative to the normal scale of the meter.

4. Apparatus for measuring electrical voltages comprising a voltage responsive meter, a circuit for connecting the meter to a source of electrical voltages to be measured, a pair of switches in the circuit, and a pair of voltage sensitive devices connected to the meter circuit to control the switches, one of the devices operating one of the switches to open the meter circuit when the voltage is below a predetermined value which is negative with respect to the normal scale of the meter and the other of the devices operating the other switch to open the meter circuit when the voltage is above a predetermined higher value.

EARLE L. KENT.

REFERENCES CITED

The following references are of record in the file of this patent:

UNITED STATES PATENTS

| Number | Name | Date |
| --- | --- | --- |
| 1,907,112 | Hopper | May 2, 1933 |
| 1,991,060 | Osbon | Feb. 12, 1935 |
| 1,994,232 | Schuck, Jr. | Mar. 12, 1935 |
| 2,191,203 | Place et al. | Feb. 20, 1940 |
| 1,401,654 | Shepard | Dec. 27, 1921 |
| 1,663,086 | Long | Mar. 20, 1928 |
| 1,916,782 | Crossley | July 4, 1933 |
| 2,093,512 | Bowen | Sept. 21, 1937 |
| 2,292,641 | Jones | Aug. 11, 1942 |
| 2,304,813 | Gibbs et al. | Dec. 15, 1942 |
| 1,901,344 | Horton | Mar. 14, 1933 |

FOREIGN PATENTS

| Number | Country | Date |
| --- | --- | --- |
| 401,951 | Great Britain | Nov. 23, 1933 |
| 353,534 | Great Britain | July 30, 1931 |
| 406,360 | Great Britain | Feb. 26, 1934 |
| 510,885 | Great Britain | Aug. 9, 1939 |

OTHER REFERENCES

"Handbook for Electrical Engineers," Pender, pub. 1914 by John Wiley & Sons, Inc., N. Y., p. 1079.